(12) United States Patent
Johnson

(10) Patent No.: US 7,111,638 B2
(45) Date of Patent: Sep. 26, 2006

(54) EXCESS FLOW SHUTOFF

(75) Inventor: Dwight N. Johnson, Carlsbad, CA (US)

(73) Assignee: Safety Flow Company, LLC, Los Angeles, CA (US)

( * ) Notice: Subject to any disclaimer, the term of this patent is extended or adjusted under 35 U.S.C. 154(b) by 252 days.

(21) Appl. No.: 10/430,654

(22) Filed: May 6, 2003

(65) Prior Publication Data
US 2004/0221893 A1 Nov. 11, 2004

(51) Int. Cl.
F16K 17/30 (2006.01)

(52) U.S. Cl. .................. 137/460; 137/504; 137/508; 137/514

(58) Field of Classification Search ............ 137/460, 137/498, 504, 508, 514, 517
See application file for complete search history.

(56) References Cited

U.S. PATENT DOCUMENTS

| | | | |
|---|---|---|---|
| 2,635,629 A * | 4/1953 | Asaro | 137/517 |
| 2,917,077 A | 12/1959 | Ziege | |
| 3,735,777 A | 5/1973 | Katzer et al. | 137/514.5 |
| 3,794,063 A | 2/1974 | Carroll et al. | |
| 3,850,199 A | 11/1974 | Stone et al. | |
| 3,872,884 A | 3/1975 | Busdiecker et al. | |
| 3,910,306 A | 10/1975 | Ohrn | |
| 3,974,852 A | 8/1976 | Svensson | |
| 4,174,731 A | 11/1979 | Sturgis et al. | |
| 4,188,971 A | 2/1980 | Otteson | |
| 4,250,915 A * | 2/1981 | Rikuta | 137/501 |
| 4,347,867 A | 9/1982 | Peters | |
| 4,436,111 A | 3/1984 | Gold et al. | |
| 4,605,039 A | 8/1986 | Johnson et al. | |
| 4,809,740 A | 3/1989 | Nevlud | |
| 4,811,756 A | 3/1989 | Hall | |
| 4,995,422 A | 2/1991 | Chew et al. | |
| 5,060,689 A | 10/1991 | Csaszar et al. | |
| 5,107,679 A * | 4/1992 | Bartlett | 137/498 |
| 5,127,431 A * | 7/1992 | Credle, Jr. | 137/504 |
| 5,178,422 A | 1/1993 | Sekerchak | |
| 5,215,178 A | 6/1993 | Bartlett | |
| 5,375,887 A | 12/1994 | Johnson | |
| 5,462,081 A | 10/1995 | Perusek et al. | |
| 5,709,239 A | 1/1998 | Macalello et al. | |
| 6,019,115 A | 2/2000 | Sanders | |
| 6,123,101 A | 9/2000 | Velie et al. | |
| 6,173,734 B1 | 1/2001 | Olivas et al. | |
| 6,202,683 B1 | 3/2001 | Smith | |
| 6,345,641 B1 | 2/2002 | Eielsen | |

(Continued)

FOREIGN PATENT DOCUMENTS

CN 2203388 7/1995

(Continued)

Primary Examiner—Stephen M. Hepperle
(74) Attorney, Agent, or Firm—Fish & Richardson P.C.

(57) ABSTRACT

A flexible connector incorporates an excess flow shutoff at its inlet to prevent uncontrolled flow in the event of a failure such as rupture or separation of the connector. A shutoff sleeve moves in a body between an upstream, open position and a downstream, closed position. A spring biases the shutoff sleeve toward the open position. The sleeve includes a flow metering passage, and a pressure drop resulting from excess flow through the passage moves the sleeve to the closed position against a shutoff seat. A time delay is provided by a damping system including a variable volume damper chamber defined in part by a flexible bladder. Upstream pressure is communicated to the damper chamber by a restricted flow passage provided by metal to metal contact of a washer against a body surface.

8 Claims, 2 Drawing Sheets

U.S. PATENT DOCUMENTS

| | | |
|---|---|---|
| 6,363,963 B1 | 4/2002 | White |
| 6,443,180 B1 | 9/2002 | Samuelson et al. |
| 6,634,375 B1 | 10/2003 | Olivas et al. |
| 6,644,345 B1 | 11/2003 | Dulin |

FOREIGN PATENT DOCUMENTS

| | | |
|---|---|---|
| CN | 2725664 | 9/2005 |
| FR | 2298755 | 8/1976 |
| FR | 2769681 | 4/1999 |

* cited by examiner

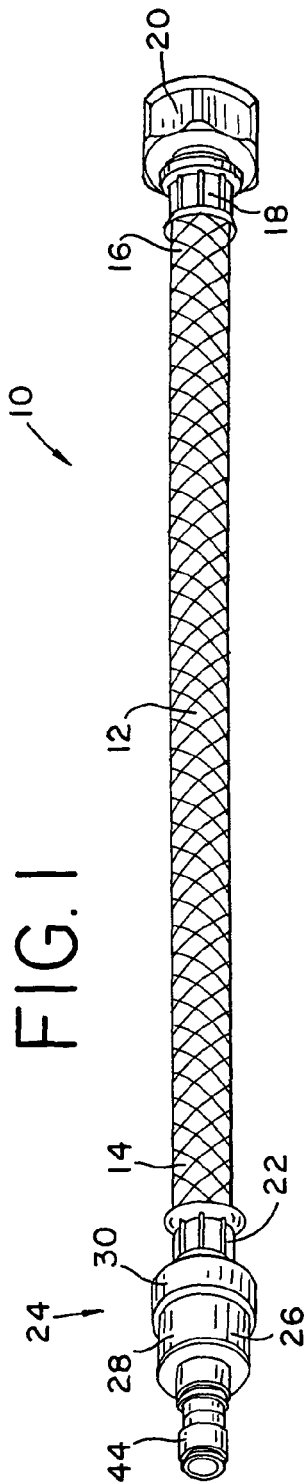
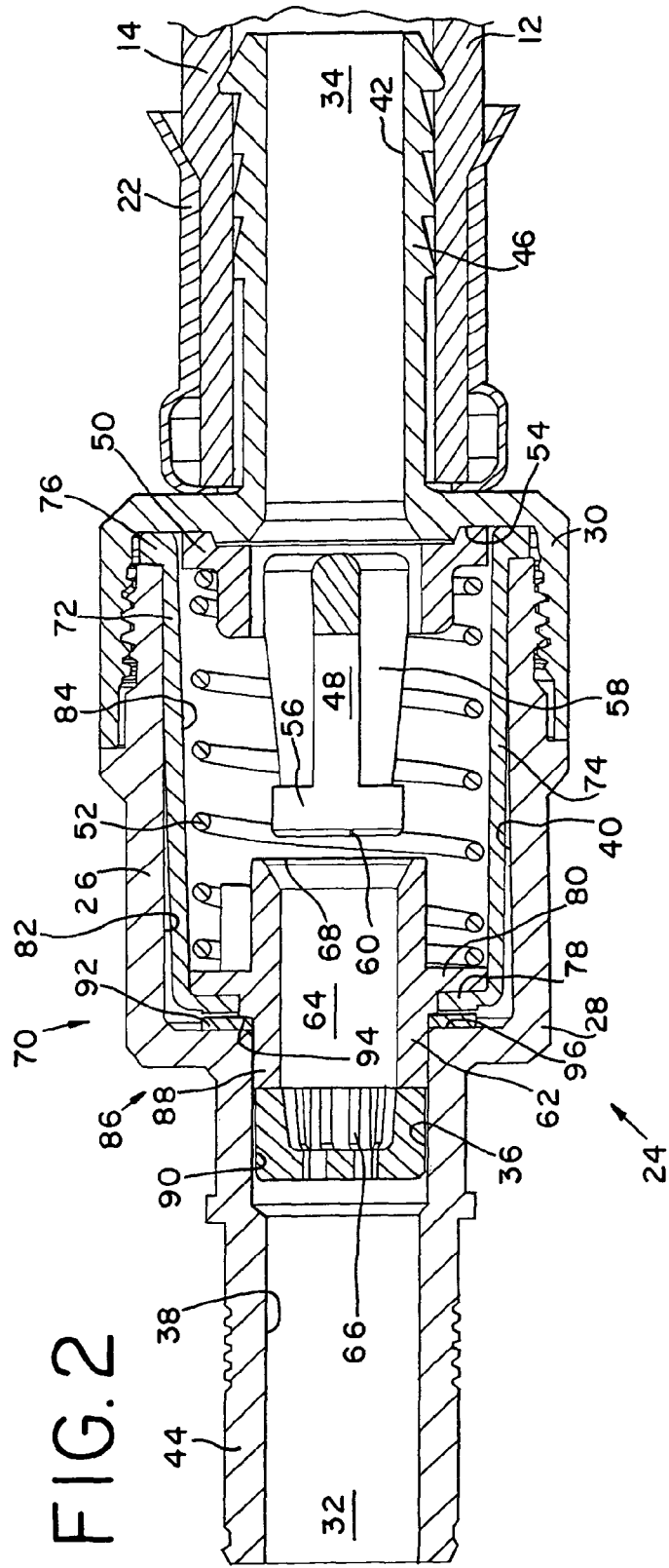

EXCESS FLOW SHUTOFF

FIELD OF THE INVENTION

The present invention relates to an excess flow shutoff for household water systems and the like.

DESCRIPTION OF THE PRIOR ART

In household and other water systems, flexible connectors can be used to supply water to appliances such as toilets and faucets. Flexible connectors are available in many styles and lengths and are convenient to install. Installation can be further simplified with a universal hookup kit as disclosed in U.S. Pat. No. 5,375,887. Because of their convenience and low cost, flexible connectors are now widely used.

A disadvantage of flexible connector installations is that they can fail when the connector ruptures of separates. Should this occur, a large uncontrolled water flow results. This poses a serious threat of flooding and expensive water damage.

The need to prevent uncontrolled excess flow has been recognized in applications other than water systems. U.S. Pat. No. 5,215,178 discloses a rapid acting safety valve for preventing problems resulting from failure of a pressurized hydraulic line. If excess flow occurs due to hydraulic line failure, a spool 50 moves against the force of a spring 45 to close against a seat 69.

A rapid acting shutoff such as disclosed in U.S. Pat. No. 5,215,178 would be subject to premature nuisance shutoff if used to supply a flexible connector in a household water system. In a water system, air can be present in the piping system. A flow surge can occur when air flows through a faucet or toilet fill valve supplied from a flexible connector. A rapid acting shutoff could close in response to such a surge, disabling the supplied appliance until the shutoff condition is corrected by reopening the shutoff device.

U.S. Pat. No. 3,735,777 recognizes this problem and discloses a shutoff having a damping capability for preventing rapid closure. Damping is effected by entry of O-ring 31 on valve member 25 into cylinder 22 as the valve member 25 moves toward the closed position. A restricted passage 32 permits only gradual movement of the valve body 25 into the cylinder 22.

The shutoff disclosed in U.S. Pat. No. 3,735,777 is complex and expensive and requires many parts. In addition, that design can be subject to seal drag, especially under long term, hot water conditions. In the shutoff of U.S. Pat. No. 3,735,777 the damping effect is achieved during valve closing motion. However it would be desirable to provide an excess flow shutoff wherein a delay period resulting from a damping effect precedes an abrupt, essentially valve closing.

SUMMARY OF THE INVENTION

A primary object of the present invention is to provide an improved excess flow shutoff. Other objects are to provide an excess flow shutoff for avoiding water damage resulting from flexible connector failure in a water system; to provide an excess flow shutoff that is not subject to premature nuisance shutoff resulting from transient elevated flows due to air in the water system; to provide an excess flow shutoff that operates quickly from open to closed positions following a damper controlled delay period; and to provide an excess flow shutoff that is reliable and rugged, simple and inexpensive.

In brief, in accordance with the invention there is provided an excess flow shutoff including a body having a flow path with an inlet passage, a enlarged central cavity, and an outlet extending from the cavity. A shutoff seat is provided in the flow path between the inlet passage and the outlet. A shutoff sleeve is mounted in the body for movement between an upstream open position and a downstream closed position and has an upstream stem portion slideably received in the inlet passage with a clearance defining a damper flow path. The shutoff sleeve has a downstream closure portion engageable with the shutoff seat to block flow through the flow passage in the closed position. A spring in the cavity biases the shutoff sleeve toward the open position. A flow metering passage through the shutoff sleeve develops a flow responsive pressure drop urging the shutoff sleeve against the biasing force of the spring from the open position to the closed position in response to excess liquid flow. A variable volume damper chamber is defined in part by a resilient damper bladder. A restricted passage extends from the damper flow path to the damper chamber for increasing the pressure in the damper chamber in response to increasing flow through the flow path.

BRIEF DESCRIPTION OF THE DRAWING

The present invention together with the above and other objects and advantages may best be understood from the following detailed description of the preferred embodiment of the invention illustrated in the drawings, wherein:

FIG. 1 is an isometric side view of a flexible connector including an excess flow shutoff constructed in accordance with the present invention;

FIG. 2 is an enlarged, axial cross sectional view of the excess flow shutoff showing the excess flow shutoff in the open position;

DETAILED DESCRIPTION OF THE PREFERRED EMBODIMENT

Figure 3:
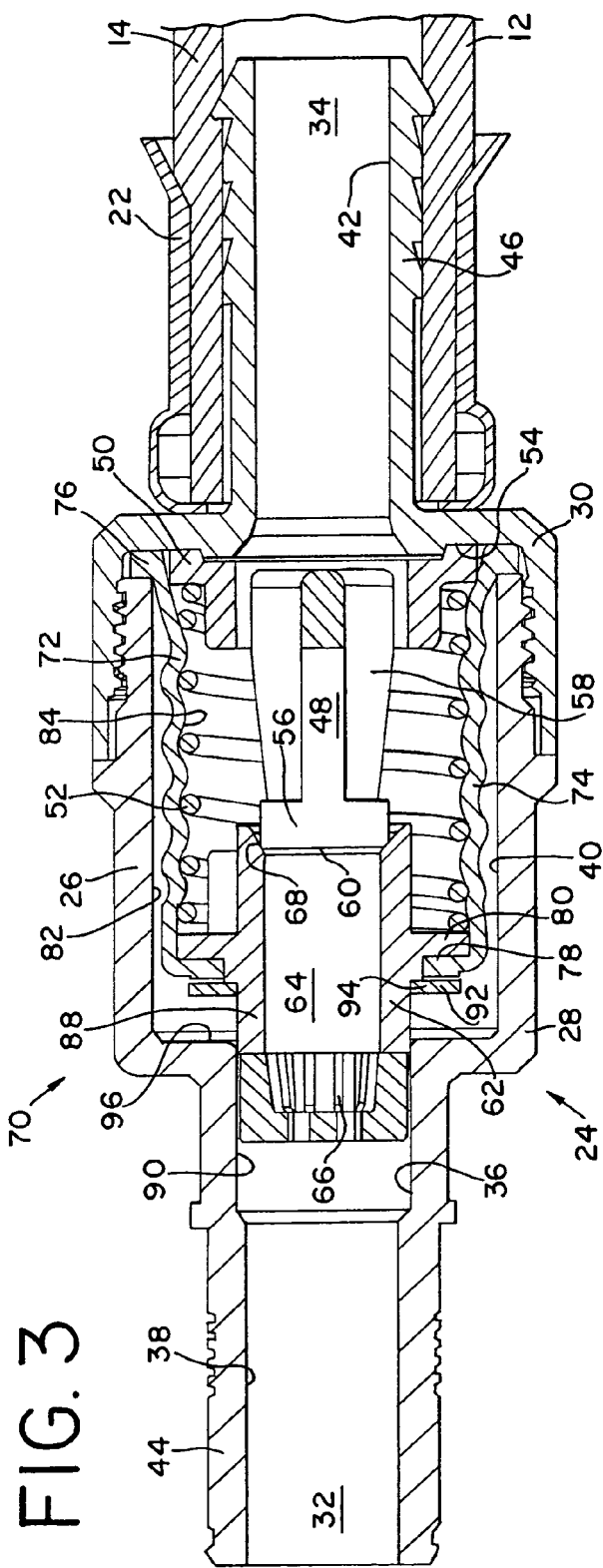
FIG. 3 is a view like FIG. 2 showing the excess flow shutoff in the closed position.

Having reference now to the drawing, and initially to FIG. 1 there is illustrated a flexible connector generally designated as 10 suitable for connecting an appliance such as a faucet or toilet tank fill valve to a household or other water system. The flexible connector 10 includes a length of flexible conduit 12 extending between an inlet 14 and an outlet 16. The flexible conduit 12 can be made of any conventional material such as an ethylene propylene plastic covered with braided nylon. At the outlet 16, the conduit 12 is attached by a crimped ferrule 18 to a conventional coupling nut fitting 20 designed to mate with the inlet of an appliance such as a faucet or toilet. At the inlet 14, the conduit 12 is attached by a crimped ferrule 22 to an excess flow shutoff generally designated as 24 and constructed in accordance with the principles of the present invention.

Flexible connectors such as the connector 10 can fail. Typical failure modes are rupture of the wall of the conduit 12 and separation of the conduit from the fitting at one of the crimped ferrules 18 or 22. Such a failure presents a problem because of the damage that can result from large uncontrolled flow into a home or other structure. This problem is solved in accordance with the present invention by supplying water to the flexible connector 10 through the excess flow shutoff 24.

In the embodiment of the invention illustrated in the drawings, the excess flow shutoff 24 is incorporated into the inlet 14 of the flexible connector 10. The advantage of this arrangement is that the installer need only use the single flexible connector 10 and thereby obtains the protection provided by the included excess flow shutoff. However, if desired, the excess flow shutoff can be provided as a separate unit for attachment, for example, with conventional fittings between a water system and the inlet of a conventional flexible connector or other connector device. As another alternative, the excess flow shutoff could be incorporated into a water supply fitting such as an angle stop.

Figure 4:
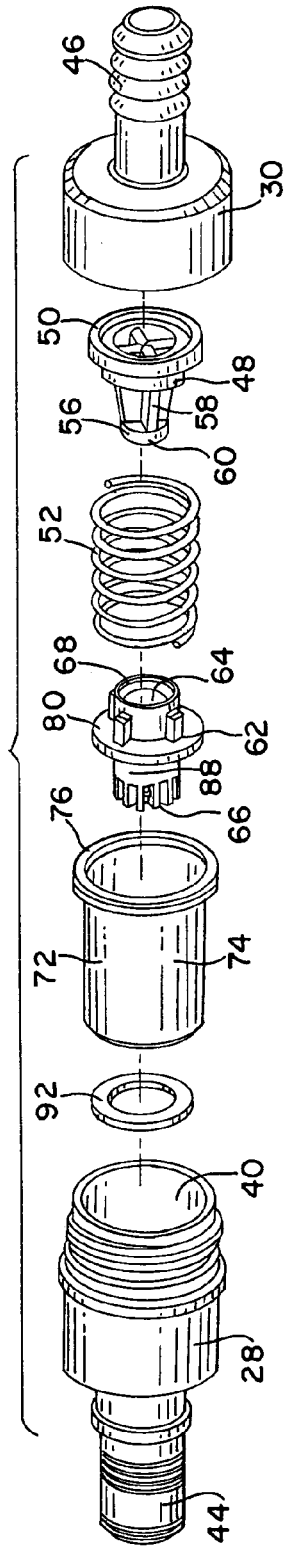
FIG. 4 is an exploded isometric view of the components of the excess flow shutoff.

The construction of the excess flow shutoff 24 is seen in FIGS. 2–4. The excess flow shutoff 24 has a body 26 including a base 28 and a cap 30 threaded onto the base 28. Water enters the body 26 through an inlet 32 and leaves the body 26 through an outlet 34. A flow path 36 through the body 26 from the inlet 32 to the outlet 34 includes an inlet passage 38, an enlarged central cavity 40 and an outlet passage 42. In the illustrated embodiment of the invention, the inlet passage 38 extends through a fitting or terminal portion 44 of the base 28 of body 26. The terminal portion 44 may be a terminal of a plumbing hookup kit as described in U.S. Pat. No. 5,375,887, incorporated herein by reference. That patent may be consulted for a further description of the terminal portion 44. Alternatively, the inlet passage could be associated with any conventional fitting assembly, such as a fitting mating with a conventional water supply fitting such as an angle stop.

In the illustrated embodiment of the invention, the outlet passage 42 extends through a barbed shank portion 46 of the cap portion 30 of body 26. The inlet 14 of the conduit 12 is attached to the barbed shank portion 46 by the crimped ferrule 22. Alternatively, the outlet passage 42 could be associated with a conventional fitting such as a threaded shank for connection to other devices.

A shutoff member 48 mounted within the cavity 40 includes a base 50 held by a spring 52 against a downstream cavity wall 54. A head portion 56 held upstream from the base 50 by a pedestal 58 includes a shutoff seat 60. In the open position of the excess flow shutoff seen in FIG. 2, water can flow around the shutoff seat 60, along the pedestal 58 and through the base 50 into the outlet passage 42.

A shutoff sleeve 62 is movable in the body 26 between an upstream, open position seen in FIG. 2 and a downstream, closed position seen in FIG. 3. In the open position of FIG. 2 water flows through an axial flow metering passage 64 extending though the shutoff sleeve 62. A strainer 66 is formed as an integral part of the sleeve 62. The spring 52 normally holds the shutoff sleeve 62 in the open position. A pressure drop resulting from flow through the flow metering passage 64 moves the shutoff sleeve 62 to the closed position as described below in connection with the operation of the excess flow shutoff 24. In the closed position of FIG. 3, an annular closure surface portion 68 of the shutoff sleeve 62 engages the shutoff seat 60 of the shutoff member 48 to block flow through the body 26 of the excess flow shutoff 24.

A damping assembly generally designated as 70 prevents premature nuisance operation of the excess flow shutoff 24 in response to transient flow peaks such as could result from air in the water system. The damping assembly 70 includes a flexible bladder 72 preferably made of rubber or other elastomer. The bladder 72 includes a generally cylindrical body portion 74, a radially outwardly directed sealing flange 76 at its downstream end and a radially inwardly directed mounting flange 78 at its upstream end. The bladder 72 is mounted in the cavity 40, with the integral sealing flange 76 captured between the base 28 and cap 30 to seal the body 26 without the need for a separate seal member. The mounting flange 78 engages the downstream side of a flange 80 of the shutoff sleeve 62.

The cylindrical body 74 of the bladder 72 encloses and surrounds the spring 52, and as seen in FIG. 2 normally is spaced radially outward from the outside diameter of the spring 52. The bladder cooperates with the body 26 to define a variable volume damper chamber 82 located radially outside the bladder 72. The bladder 72 divides the cavity 40 of the body 26 into two portions, a flow region 84 within the bladder 72 and the damper chamber 82 outside of the bladder 72.

Flow through the flow metering passage 64 results in a drop in pressure between the upstream and downstream ends of the flow metering passage 64. The flow region 84 is subjected to the lower, downstream pressure. The inlet passage 38 is subjected to the higher, upstream pressure. The high pressure inlet passage 38 communicates with the damper chamber 82 through a restricted flow passage 86. The shutoff sleeve 62 includes a stem portion 88 slideable in an enlarged diameter segment 90 of the inlet passage 38. A radial clearance between nose 88 and the wall of passage segment 90 permits flow from the inlet passage 38 toward the damper chamber 82.

A washer 92 is captured between an upstream facing shoulder 94 of the shutoff sleeve 62 and a downstream facing end wall 96 of the cavity 40. The spring 52 normally clamps the upstream face of the washer 92 in face to face abutment against the wall 96. These interfacing surfaces define the restricted flow passage 86. Various features such as grooves, abutments or other surface configurations can be used to permit a controlled, restricted flow across these interfacing surfaces. A preferred approach is to form both surfaces of metal by making both the base 28 and the washer 92 of metal. The resulting metal to metal contact provides a controlled leakage path having the desired restricted flow characteristic.

In operation, the flexible connector 10 is installed into a household or similar water system by connecting the fitting 20 to a appliance such as a faucet or a toilet tank fill valve and by connecting the terminal or other fitting 44 to an angle stop or other water supply connection. The spring 52 applies a biasing force in the upstream direction to the shutoff sleeve 62, holding it in the open position of FIG. 2, and clamping the washer 92 against the wall 96 of the cavity 40. In this normal, open position (FIG. 2), water can flow from the water system, through the excess flow shutoff 24 and conduit 12 to the connected appliance.

Pressurized water is then applied to the connector 10, for example by opening a valve included in the angle stop of the water system. When the connected appliance uses water, water flows through the connector 10 and through the excess flow shutoff 24. The maximum flow rate into a typical appliance in a typical water system is about two gallons per minute. With this normal flow rate, the pressure drop across the shutoff sleeve 62 develops a force tending to move the shutoff sleeve away from the open position, but this force is less than the force applied in the opening direction by the spring 52. As a result, during normal operation of the connected appliance, the shutoff sleeve remains in the open position of FIG. 2.

An excess flow condition can result, for example, from rupture of the conduit 12 of connector 10 or separation of the conduit 12 from a fitting at one of the crimped ferrules 18 and 22. The increased flow rate causes the excess flow shutoff 24 to close, preventing sustained uncontrolled flow, flooding and water damage. If flow increases to a sustained elevated rate such as more than three gallons per minute, the pressure drop across the flow metering passage 64 in the shutoff sleeve increases to a value that results in a closing force greater that the opening force applied by the spring 52.

The damping assembly 70 provides a time delay in closing operation and the excess flow shutoff 24 does not move or close immediately as a result of a flow rate increase. The upstream pressure in the inlet passage 38 is communicated to the damper chamber 82 through the restricted flow passage 86. When pressure increases due to an excess flow rate, the initial effect is to gradually increase the volume of the damper chamber 82 as water gradually enters the damper chamber 82 through the restricted flow passage 86. As a result, the volume of the damper chamber 82 increases and the body 74 of the bladder 72 gradually collapses against the outside diameter of the spring 52 as seen in FIG. 3. If the excess flow is a transient event resulting for example from the flow of trapped air through the connected appliance, the flow rate returns to normal before the damper chamber reaches its maximum volume and the shutoff sleeve 62 does not move from its open position of FIG. 1.

If the excess flow continues, as occurs if the flexible connector 10 fails, the damper chamber 82 expands to its maximum volume with the bladder body portion 74 against the spring 52 as seen in FIG. 3. During expansion of the damper chamber 82, the pressures in the damper chamber 82 and in the flow region 84 within the bladder 72 are generally equalized by flexibility of the bladder 72. When the damper chamber 82 reaches its maximum volume, pressure in the damper chamber 82 increases as further bladder movement is blocked by contact against the spring 52. At this point, the shutoff sleeve 62 moves away from the open position of FIG. 2. The closure surface portion 68 approaches the shutoff seat 60 of the shutoff member 48, throttling flow between the closure portion 68 and the shutoff seat 60. An increasing pressure drop due to this throttling action causes the shutoff sleeve to move quickly to the closed position of FIG. 3.

The effect of the damping chamber 82 defined in part by the flexible bladder 72 in a moderate excess flow condition is to provide an initial time delay during which there is no movement of the shutoff sleeve 62. A transient excess flow does not cause sleeve motion during the damping delay period. If excess flow continues, at the end of the delay period, the shutoff sleeve 62 moves abruptly from the open to the closed position. Inlet pressure then clamps the sleeve 62 closed until such time as the excess flow shutoff 24 is reset by removing inlet pressure after repair of the excess flow fault condition.

The use of a flexible bladder for the damper chamber avoids a seal drag problem that can occur with other damper systems. The strainer 66 blocks out any particles large enough to interfere with closing of the shutoff sleeve 62 against the shutoff seat 60. Closing speed of the shutoff sleeve 62 is moderated by the flow clearance between the stem 88 and the passage segment 90 in order to prevent a water hammer effect While the present invention has been described with reference to the details of the embodiments of the invention shown in the drawing, these details are not intended to limit the scope of the invention as claimed in the appended claims.

What is claimed is:

1. An excess flow shutoff comprising:
   a body having a flow path including an inlet passage, a enlarged central cavity, and an outlet extending from said cavity;
   a shutoff seat in said flow path between said inlet passage and said outlet;
   a shutoff sleeve mounted in said body for movement between an upstream open position and a downstream closed position and having an upstream stem portion slideably received in said inlet passage with a clearance defining a damper flow path;
   said shutoff sleeve having a downstream closure portion engageable with said shutoff seat to block flow through said flow path in said closed position;
   a spring in said cavity biasing said shutoff sleeve toward said open position;
   a flow metering passage through said shutoff sleeve for developing a flow responsive pressure drop urging said shutoff sleeve against the biasing force of said spring from said open position to said closed position in response to excess liquid flow;
   a resilient damper bladder;
   a variable volume damper chamber defined in part by said resilient damper bladder; and
   a restricted passage extending from said damper flow path to said damper chamber for increasing the pressure in said damper chamber in response to increasing flow through said flow path.

2. An excess flow shutoff as claimed in claim 1 wherein said cavity includes a metal surface surrounding said inlet passage, and further comprising a metal washer between said shutoff sleeve and said surface, the interface between said metal surface and said metal washer defining said restricted passage.

3. An excess flow shutoff as claimed in claim 1, further comprising a shutoff member including said shutoff seat, said spring comprising a coil spring in compression between said shutoff member and said shutoff sleeve.

4. An excess flow shutoff as claimed in claim 3, said flexible damper bladder surrounding and enclosing said spring in said chamber.

5. An excess flow shutoff as claimed in claim 4, said body including a base portion and a cap, said bladder including a flange portion clamped in sealing relation between said base portion and said cap.

6. An excess flow shutoff as claimed in claim 4, said damper chamber being defined between the outside of said bladder and the wall of said cavity.

7. An excess flow shutoff as claimed in claim 6, said bladder being normally spaced away from said spring, and collapsing toward and upon said spring as the volume of said damper chamber increases.

8. An excess flow shutoff as claimed in claim 7 wherein said cavity includes a metal surface surrounding said inlet passage, and further comprising a metal washer between said shutoff sleeve and said surface, the interface between said metal surface and said metal washer defining said restricted passage.

* * * * *

UNITED STATES PATENT AND TRADEMARK OFFICE
CERTIFICATE OF CORRECTION

PATENT NO. : 7,111,638 B2
APPLICATION NO. : 10/430654
DATED : September 26, 2006
INVENTOR(S) : Dwight Johnson It is certified that error appears in the above-identified patent and that said Letters Patent is hereby corrected as shown below:

<u>Column 6</u>

Line 61, please insert the following claims:

--9. An excess flow shutoff, comprising:
a body;
a shutoff sleeve mounted in the body for movement between an open position permitting flow through the body and a closed position limiting flow through the body; and
a resilient damper bladder located within the body and defining a variable volume damper chamber such that movement of the bladder in response to an increase in the volume of the damper chamber provides a time delay in movement of the shutoff sleeve toward the closed position in response to flow rate increase,
wherein the body has a flow path including an inlet passage, and the shutoff sleeve has an upstream stem portion slideably received in the inlet passage with a clearance defining a damper flow path in fluid communication with the variable volume damper chamber.

10. The excess flow shutoff of claim 9 further defining a restricted passage extending from the damper flow path to the damper chamber for increasing the pressure in the damper chamber in response to increasing flow through the flow path.

11. The excess flow shutoff of claim 10 wherein the restricted passage is defined by an interface between a metal surface of the cavity and a metal washer.

12. The excess flow shutoff of claim 11 wherein the metal washer is between the metal surface and the shutoff sleeve.

13. The excess flow shutoff of claim 9 further comprising a shutoff seat in the body.

14. The excess flow shutoff of claim 13 wherein the shutoff sleeve includes a downstream closure portion engageable with the shutoff seat to limit flow through the main flow path in the closed position.

15. The excess flow shutoff of claim 14 further comprising a shutoff member including the shutoff seat, and a coil spring in compression between the shutoff member and the shutoff sleeve.

UNITED STATES PATENT AND TRADEMARK OFFICE
CERTIFICATE OF CORRECTION

PATENT NO. : 7,111,638 B2
APPLICATION NO. : 10/430654
DATED : September 26, 2006
INVENTOR(S) : Dwight Johnson It is certified that error appears in the above-identified patent and that said Letters Patent is hereby corrected as shown below:

16. The excess flow shutoff of claim 15 wherein the resilient damper bladder surrounds and encloses the spring.

17. The excess flow shutoff of claim 9 wherein the body defines an enlarged central cavity and an outlet extending from the cavity.

18. The excess flow shutoff of claim 17 further comprising a spring located in the cavity biasing the shutoff sleeve toward the open position.

19. The excess flow shutoff of claim 18 further comprising a flow metering passage through the shutoff sleeve for developing a flow responsive pressure drop urging the shutoff sleeve against the biasing force of the spring from the open position to the closed position in response to excess liquid flow.

20. The excess flow shutoff of claim 9 further comprising a spring biasing the shutoff sleeve toward the open position.

21. An excess flow shutoff, comprising:
a body;
a shutoff sleeve mounted in the body for movement between an open position permitting flow through the body and a closed position limiting flow through the body;
a resilient damper bladder located within the body and defining a variable volume damper chamber such that movement of the bladder in response to an increase in the volume of the damper chamber provides a time delay in movement of the shutoff sleeve toward the closed position in response to flow rate increase;
a spring biasing the shutoff sleeve toward the open position; and
a flow metering passage through the shutoff sleeve for developing a flow responsive pressure drop urging the shutoff sleeve against the biasing force of the spring from the open position to the closed position in response to excess liquid flow.

22. The excess flow shutoff of claim 9 wherein the body includes a base portion and a cap, the resilient damper bladder including a flange portion clamped in sealing relation between the base portion and the cap.

23. The excess flow shutoff of claim 9 wherein the damper chamber is defined between an outside of the resilient damper bladder and a wall of the body.

24. The excess flow shutoff of claim 9 further comprising a conduit mechanically coupled to the body.

UNITED STATES PATENT AND TRADEMARK OFFICE
CERTIFICATE OF CORRECTION

PATENT NO. : 7,111,638 B2
APPLICATION NO. : 10/430654
DATED : September 26, 2006
INVENTOR(S) : Dwight Johnson It is certified that error appears in the above-identified patent and that said Letters Patent is hereby corrected as shown below:

25. The excess flow shutoff of claim 24 wherein the conduit comprises a flexible conduit.

26. The excess flow shutoff of claim 24 further comprising a ferrule mechanically coupling the conduit to the body.--

Signed and Sealed this

Third Day of June, 2008

JON W. DUDAS
*Director of the United States Patent and Trademark Office*